United States Patent
Bernacchi et al.

(10) Patent No.: US 10,927,960 B2
(45) Date of Patent: Feb. 23, 2021

(54) MOUNTING ASSEMBLY FOR A CERAMIC SEAL RUNNER

(71) Applicant: Rolls-Royce Corporation, Indianapolis, IN (US)

(72) Inventors: James Bernacchi, Indianapolis, IN (US); Mark Schubert, Indianapolis, IN (US); Joseph Black, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 121 days.

(21) Appl. No.: 16/265,557

(22) Filed: Feb. 1, 2019

(65) Prior Publication Data

US 2020/0248815 A1    Aug. 6, 2020

(51) Int. Cl.
F16J 15/34    (2006.01)

(52) U.S. Cl.
CPC .................. *F16J 15/3464* (2013.01)

(58) Field of Classification Search
CPC .... F16J 15/3464; F16J 15/441; F16J 15/3268; F16J 15/166; F01D 11/003
See application file for complete search history.

(56) References Cited

U.S. PATENT DOCUMENTS

| | | | |
|---|---|---|---|
| 2,937,039 A * | 5/1960 | Santapa | F16J 15/348 |
| | | | 277/422 |
| 2,992,842 A * | 7/1961 | Shevchenko | F01D 11/003 |
| | | | 277/306 |
| 3,632,117 A * | 1/1972 | Villasor | F16J 15/342 |
| | | | 277/388 |
| 3,770,179 A | 11/1973 | McHugh | |
| 3,894,741 A | 7/1975 | McHugh | |
| 4,036,505 A * | 7/1977 | Floyd | F16J 15/3496 |
| | | | 277/405 |
| 4,174,844 A * | 11/1979 | Zobens | F16J 15/3404 |
| | | | 277/390 |
| 5,014,999 A * | 5/1991 | Makhobey | F01D 11/003 |
| | | | 277/422 |
| 5,017,022 A * | 5/1991 | Ruggles | F16C 17/03 |
| | | | 384/100 |
| 5,533,739 A | 7/1996 | Sedy | |
| 5,538,257 A | 7/1996 | Sandgren | |
| 6,142,476 A * | 11/2000 | Iwane | F16J 15/3464 |
| | | | 277/358 |

(Continued)

FOREIGN PATENT DOCUMENTS

| | | | |
|---|---|---|---|
| DE | 2216762 A1 | 10/1972 | |
| EP | 0602272 A1 | 6/1994 | |

(Continued)

*Primary Examiner* — Eugene G Byrd
(74) *Attorney, Agent, or Firm* — Barnes & Thornburg LLP

(57) ABSTRACT

A seal assembly is disclosed for sealing a higher pressure fluid cavity from a lower pressure fluid cavity. The seal assembly comprises a mounting assembly, a circumferential ceramic runner carried by the mount assembly, and a carbon seal ring sealingly engaged to the runner. The runner comprises an axially-extending sealing portion and a radially-inward-extending step portion. The mounting assembly comprises a retaining member, a forward member, and a middle member. The step portion of the runner is axially retained between the retaining member and the middle member.

20 Claims, 9 Drawing Sheets

(56) References Cited

U.S. PATENT DOCUMENTS

| | | | |
|---|---|---|---|
| 6,322,081 B1* | 11/2001 | Ullah | F16C 33/76 |
| | | | 277/504 |
| 7,175,388 B2 | 2/2007 | Labbe et al. | |
| 7,410,341 B2* | 8/2008 | Gockel | F01D 25/125 |
| | | | 415/110 |
| 7,905,495 B2 | 3/2011 | Munson | |
| 8,690,159 B2 | 4/2014 | Peer et al. | |
| 9,359,912 B2 | 6/2016 | Ullah et al. | |
| 2009/0134584 A1* | 5/2009 | Lederer | F16J 15/3464 |
| | | | 277/369 |
| 2009/0142180 A1* | 6/2009 | Munson | F01D 11/003 |
| | | | 415/111 |
| 2009/0152818 A1* | 6/2009 | Droscher | F16J 15/3464 |
| | | | 277/370 |
| 2011/0123329 A1 | 5/2011 | Takeuchi et al. | |
| 2011/0175297 A1* | 7/2011 | Fesl | F16J 15/3464 |
| | | | 277/358 |
| 2012/0133099 A1* | 5/2012 | Fesl | F16J 15/3464 |
| | | | 277/358 |
| 2012/0177486 A1* | 7/2012 | Ullah | F16J 15/3464 |
| | | | 415/174.3 |
| 2013/0285331 A1* | 10/2013 | Kostka | F16J 15/445 |
| | | | 277/411 |
| 2014/0265151 A1* | 9/2014 | Vasagar | F01D 11/003 |
| | | | 277/500 |
| 2015/0115539 A1 | 4/2015 | Guenther et al. | |
| 2015/0240951 A1* | 8/2015 | Kirchner | F16J 15/3464 |
| | | | 277/500 |
| 2017/0234430 A1* | 8/2017 | Fadgen | F16J 15/3464 |
| | | | 277/500 |
| 2017/0234432 A1* | 8/2017 | Burnside | F16J 15/441 |
| | | | 277/572 |
| 2020/0072358 A1* | 3/2020 | Feinstein | F16C 35/08 |

FOREIGN PATENT DOCUMENTS

| | | |
|---|---|---|
| EP | 0602272 B1 | 4/1997 |
| EP | 2474711 A2 | 7/2012 |
| EP | 3208503 A1 | 8/2017 |
| EP | 2474711 B1 | 7/2018 |
| WO | 2014/143097 A1 | 9/2014 |

* cited by examiner

MOUNTING ASSEMBLY FOR A CERAMIC SEAL RUNNER

CROSS-REFERENCE TO RELATED APPLICATIONS

This application is related to concurrently filed and co-pending application U.S. patent application Ser. No. 16/265,506 entitled "Seal Assembly with Spring Retainer Runner Mount Assembly," the entirety of which is herein incorporated by reference.

BACKGROUND

Seals and seal assemblies may be used to isolate cavities of different pressures in a machine. For example, in a gas turbine engine a seal assembly may be used to seal a sump from higher pressure and temperature airflows elsewhere in the engine, such that oil is retained in the sump and not permitted to migrate to other regions of the engine. Oil leakage from a sump can lead to undesirable conditions such as fires, smoke, coking, and migration of oil smell.

A seal assembly typically comprises a seal ring engaged with a runner. The runner is often carried by a runner mount that is coupled to a rotatable shaft. Engagement between the seal ring and runner creates the seal.

Some existing runner mounts hold the runner in place by contacting both a radially inner and a radially outer surface of the runner. These runner mount designs can lead to excessive stresses in the runner and/or the runner mount due to edge loading along the runner/runner mount interface at the radially outer surface of the runner. These runner mount designs also require that a portion of the radially outer surface of the runner—i.e. the surface that forms a seal through engagement with the seal ring—be dedicated to mounting as opposed to sealing. Improvements in runner mount designs are therefore desirable.

SUMMARY

According to some aspects of the present disclosure, an assembly comprises a rotatable shaft, an annular ceramic seal runner, and a mounting assembly. The annular ceramic seal runner comprises a sealing portion extending around an axial portion of said shaft and a step portion extending radially inward from said sealing portion. The mounting assembly is affixed to said shaft and carries said seal runner in axial and radial alignment with said shaft. The mounting assembly comprises a retaining member, a middle member, and a forward member. The retaining member comprises a base affixed to said shaft and a wall extending radially outward from said base, said wall having an axially forward facing surface in contact with an axially rearward facing surface of the step portion of said seal runner. The middle member comprises a base affixed to said shaft axially forward of the base of said retaining member and a flexible member extending axially rearward and radially outward from said base, said flexible member terminating in a foot portion having a surface in contact with an axially forward facing surface of the step portion of said seal runner. The forward member comprises a base affixed to said shaft axially forward of the base of said middle member and a flexible member extending axially rearward and radially outward from said base, said flexible member having a radially outer surface in contact with a portion of a radially inner surface of the sealing portion of said seal runner and a radially inner surface in contact with a radially outer surface of the flexible member of said middle member.

In some embodiments said mounting assembly converts radial thermal expansion to axial compression applied to said step portion of said ceramic runner. In some embodiments a radially outward facing seal surface of said runner is free of loading from the mounting assembly. In some embodiments said ceramic runner is axially retained by frictional engagement of said step portion with each of said foot portion of said middle member and said wall of said retaining member.

In some embodiments the base of said middle member abuts the base of said forward member and the base of said retaining member. In some embodiments the assembly further comprises a tie nut providing an axial clamping load to said retaining member, said middle member, and said forward member. In some embodiments said retaining member and said forward member comprise steel, and wherein said middle member comprises titanium.

According to further aspects of the present disclosure, a seal assembly is disclosed for sealing a higher pressure fluid cavity from a lower pressure fluid cavity. The cavities are at least partially disposed between a rotatable shaft and a housing radially displaced from said rotatable shaft. The seal assembly comprises an annular ceramic seal runner, a mounting assembly, and a carbon seal ring. The annular ceramic seal runner comprises a sealing portion extending around an axial portion of said shaft and a step portion extending radially inward from said sealing portion, said sealing portion having a radially outward facing seal surface. The mounting assembly is affixed to said shaft and carries said seal runner. The mounting assembly comprises a retaining ember, a middle member, and a forward member. The retaining member comprises a base affixed to said shaft and a wall extending radially outward from said base, said wall having an axially forward facing surface in contact with an axially rearward facing surface of the step portion of said seal runner. The middle member comprises a base affixed to said shaft axially forward of the base of said retaining member and a flexible member extending axially rearward and radially outward from said base, said flexible member terminating in a foot portion having a surface in contact with an axially forward facing surface of the step portion of said seal runner. The forward member comprises a base affixed to said shaft axially forward of the base of said middle member and a flexible member extending axially rearward and radially outward from said base, said flexible member having a radially outer surface in contact with a portion of a radially inner surface of the sealing portion of said seal runner and a radially inner surface in contact with a radially outer surface of the flexible member of said middle member. The carbon seal ring is sealingly engaged with the housing and has a radially inward facing seal surface engaged with the radially outward facing seal surface of the seal runner to thereby form a boundary between the higher pressure fluid cavity and the lower pressure fluid cavity.

In some embodiments the seal runner is axially retained between said foot of said middle member and said wall of said retaining member. In some embodiments the seal runner is radially retained between said radially outer surface of said retaining member and said seal ring. In some embodiments the seal assembly further comprises an annular seal member coupled to the housing axially displaced from said seal ring in the lower pressure fluid cavity, the seal member having a curvilinear face surface that engages said radially outward facing seal surface of said seal runner.

In some embodiments said higher pressure fluid cavity comprises at least in part a buffer air chamber, and wherein a plurality of apertures extending axially through the seal ring direct a flow of buffer air from the buffer air chamber toward the annular seal member. In some embodiments said curvilinear face surface bends from an axially-facing surface to a radially-facing surface, and wherein said radially-facing surface engages said radially outward facing seal surface of said seal runner. In some embodiments said runner and said seal ring are formed from materials having coefficients of thermal expansion that are matched to effect sealing engagement between said runner and said seal ring over a predetermined range of operating temperatures. In some embodiments said radially outward facing seal surface of said runner is free of loading from the mounting assembly.

According to yet further aspects of the present disclosure, a method is presented of mounting a ceramic seal runner to a rotatable shaft. The method comprises positioning an annular ceramic seal runner around a selected portion of the shaft, the seal runner comprising a sealing portion extending axially along the shaft and a step portion extending radially inward toward the shaft; frictionally engaging the step portion between a forward axial retaining member and an aft axial retaining member; and positioning a third member radially between the sealing portion of the seal runner and a portion of the forward axial retaining member to effect axial translation of the forward axial retaining member during thermal expansion of the members.

In some embodiments the method further comprises affixing the aft axial retaining member to the shaft, the aft axial retaining member engaging the step portion of the seal runner to inhibit movement of the seal runner in a first axial direction. In some embodiments the method further comprises affixing the forward axial retaining member to the shaft, the forward axial retaining member comprising a base portion adjacent to the aft axial retaining member in a second axial direction and a flexible member extending radially outward from the base and axially in the first direction, the flexible member terminating in a foot portion engaging the step portion of the seal runner to inhibit movement of the seal runner in the second axial direction.

In some embodiments the method further comprises affixing the third member to the shaft, the third member comprising a base portion adjacent to the base of the forward axial retaining member in the second direction and a flexible member radially outward from said base and axially in the first direction to engage the sealing portion of the seal runner on one side and the flexible arm of the forward axial retaining member on an opposite side. In some embodiments the method further comprises selecting materials for the forward axial retaining member and the third member having relative indices of thermal expansion to effect translation of thermal growth of the members to axial extension of the forward axial retaining member in the first direction.

BRIEF DESCRIPTION OF THE DRAWINGS

The following will be apparent from elements of the figures, which are provided for illustrative purposes.

Figure 1:
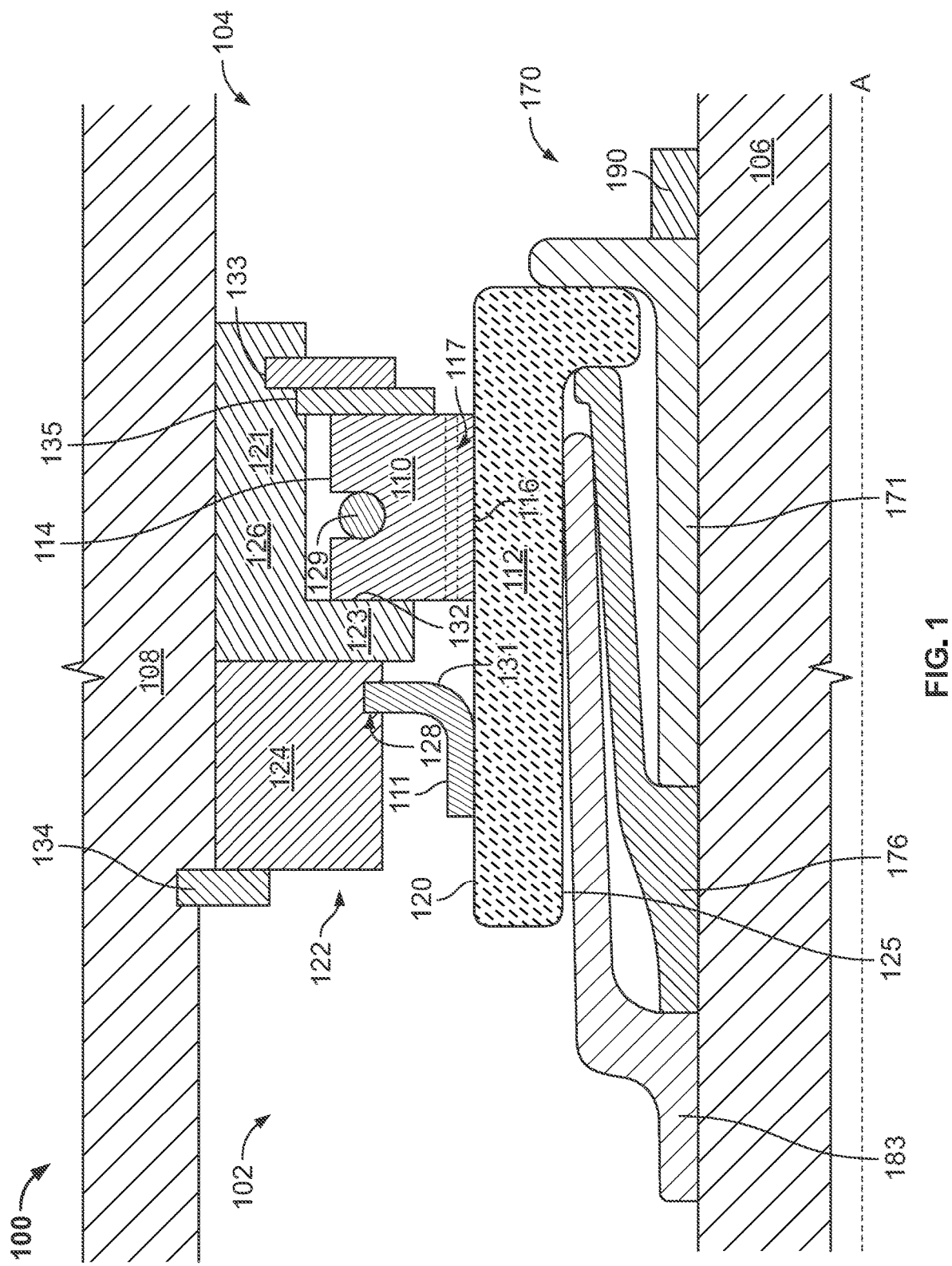
FIG. 1 is a schematic cross sectional view of a seal assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Seal assemblies in rotating machines such as gas turbine engines that use a circumferential carbon seal ring and ceramic runner offer numerous advantages over existing seal assemblies that typically use a metal runner. Clearance between the carbon seal ring and ceramic runner can be more closely controlled because the materials of the seal ring and runner have closer and/or matched coefficients of thermal expansion. Closer clearance control over the full range of operating conditions ensures less leakage and less risk of oil passing through the seal assembly. Further, the use of a ceramic runner may allow for the reduction or elimination of direct oil cooling to the runner, as the ceramic runner is able to operate at higher temperatures. Reduction or elimination of direct oil cooling carries additional benefits, namely reducing the size and complexity of oil cooling systems.

However, a seal mount is required for this type of seal assembly in order to mount the ceramic runner to the metal rotatable shaft and compensate for the differential thermal growth between the runner and the shaft. The seal mount must provide adequate compliance between the shaft and the ceramic to accommodate any unacceptable stresses, excursions, and/or deflections.

Runners made from ceramic tend to have relatively high compressive yield stress but relatively low tensile yield stress. Ceramic runners also tend to be brittle, with a small elastic region. With these material difficulties in mind, ceramic runners must be coupled in some manner to the metal rotatable shaft of the engine. The assembly for mounting the runner to the shaft necessarily must account for differences in the coefficient of thermal expansion between the ceramic runner and the metal shaft, and must also accommodate excursions in the relative positioning between the two. Existing ceramic runner mounts may use a "clip" approach that includes runner/runner mount interfaces along both the radially inner and radially outer surfaces of the runner. These interfaces ensure that the runner mount is able to hold the runner against the seal ring to maintain an effective seal, while also allowing some degree of flexing between the runner and the rotatable shaft.

Unfortunately, the clip approach to runner mount design can negatively impact the effective lifespan of the runner and/or the runner mount. The runner/runner mount interface along the radially outer surface of the runner may experience excessive stresses (i.e. edge loading) during operation, leading to wear of one or more components at an unacceptable rate. For example, excessive wear may occur at the interface between the clip and the ceramic runner. Further, the clip approach reduces the size of the radially outer surface of the runner available for sealing because some portion of that surface is used for mounting purposes.

To prevent excessive edge loading at the runner/runner mount interface along the radially outer surface of the runner and to free a portion of that radially outer surface, the present disclosure is directed to systems and methods of forming a seal in a rotating machine. A seal assembly may comprise a mounting assembly, a runner, and a seal ring. The runner may have an axially-extending sealing portion and a radially-extending step portion, which may extend radially inward from the axially-extending portion. The mounting assembly may comprise a retaining member, a middle member, and a forward member. The mounting assembly may carry the runner with the radially-extending step portion held between the retaining member and the middle member. The seal assembly may further comprise a buffered annular sealing member or lip seal.

Figure 2:
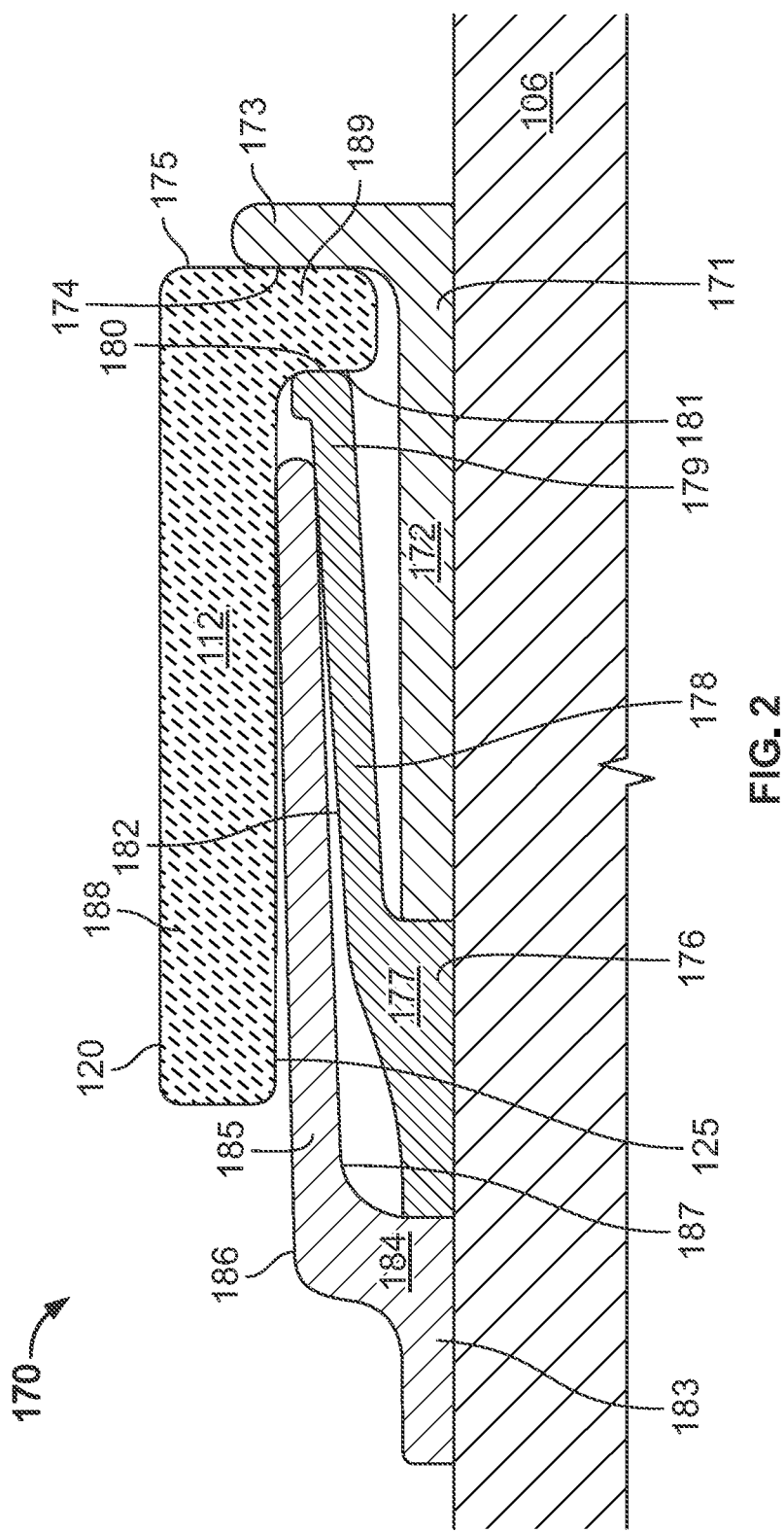
FIG. 2 is a detailed schematic cross sectional view of a runner and runner mount of a seal assembly in accordance with some embodiments of the present disclosure.

A schematic cross sectional view of an embodiment of the seal assembly 100 is provided in FIGS. 1 and 2. FIGS. 4 through 9 provide isometric views of certain components of the seal assembly 100.

The seal assembly 100 seals a higher pressure fluid cavity 104 from a lower pressure fluid cavity 102. The higher and lower pressure fluid cavities 104, 102 may be at least partially disposed between a rotatable shaft 106 and a housing 108. The seal assembly 100 comprises a seal ring 110, a circumferential runner 112, and a mounting assembly 170.

The higher pressure fluid cavity 104 may be referred to as a first cavity, and may be, for example, a region of a rotating machine such as a gas turbine engine that receives and directs higher pressure and/or higher temperature airflow. All or a portion of the higher pressure fluid cavity 104 may comprise a buffer air chamber.

The lower pressure fluid cavity 102 may be referred to as a second cavity, and may be, for example, a region of a rotating machine such as a gas turbine engine that receives and directs lower pressure and/or lower temperature airflow. The lower pressure cavity 102 may be a sump or bearing chamber.

The rotatable shaft 106 may define an axis A of the rotating machine. The rotatable shaft may be hollow. A housing 108 may be disposed about or radially outward of the rotatable shaft 106. The housing 108 may be radially displaced from the shaft 106. The housing 108 may be a static structure of the rotating machine (i.e. may not rotate). The housing 108 may be a sump housing or similar structure, and may at least partly define each of the higher pressure fluid cavity 104 and lower pressure fluid cavity 102.

The seal ring 110 is disposed between the housing 108 and the shaft 106. The seal ring 110 may be annular, and may be formed as a single member or may comprise more than one member. In embodiments having a seal ring 110 comprising more than one member, the member may be joined for example by slip joints. The seal ring 110 may also comprise a single annular member. The seal ring 110 may have a radially outward facing surface 114 and a radially inward facing seal surface 116. The seal ring may comprise carbon.

The runner 112 may be an annular member and may be radially displaced from the shaft 106. The runner 112 may be carried by the shaft 106. The runner 112 may be carried by a mounting assembly 170 coupled to the shaft 106. The runner 112 may comprise an axially-extending sealing portion 188 and a radially-extending step portion 189. The sealing portion 188 may define a radially outward facing seal surface 120 and a radially inner surface 125 extending axially along the shaft 106. The step portion 189 may define an axially forward facing surface 181 and an axially rearward facing surface 175. The runner 112 may comprise ceramic. The runner 112 may comprise silicon carbide, silicon nitride, or alumina.

The seal ring 110 may be an archbound carbon seal. The seal ring 110 may sealingly engage the runner 112. A seal ring 110 that is sealingly engaged with a runner 112 is in contact with the runner 112 or in sufficient proximity to the runner 112 such that a seal is formed between the seal ring 110 and runner 112. The radially inward facing surface 116 of the seal ring 110 may sealingly engage the radially outward facing surface 120 of the runner 112. In some embodiments, the radially inward facing surface 116 of the seal ring 110 may contact the radially outward facing surface 120 of the runner 112.

The seal ring 110 and runner 112 may be formed from materials having coefficients of thermal expansion that are matched to effect sealing engagement between the seal ring 110 and runner 112 over a predetermined range of operating temperatures.

The mounting assembly 170 may be carried by the shaft 106, and may extend radially from the shaft 106 to space the runner 112 from the shaft 106. The mounting assembly 170 may comprise a retaining member 171, a forward member 183, and a middle member 176. The retaining member 171 and the middle member 176 may cooperate to retain the step portion 189 of the runner 112.

The retaining member 171 may comprise a base 172 and a wall 173. The base 172 may extend axially along the shaft 106 and be affixed to the shaft 106. The wall 173 may extend radially outward, away from the base 172 and the shaft 106. The wall 173 may define an axially forward facing surface 174 that may contact or frictionally engage the axially rearward facing surface 175 of the step portion 189. The retaining member 171 may comprise metal such as, for example, steel or titanium.

The forward member 183 may comprise a base 184 and a flexible member 185 extending axially and radially away from the base 184. The base 184 may extend axially along the shaft 106 and may be affixed to the shaft 106. The flexible member 185 may extend from the base 184 and toward the sealing portion 188 of runner 112. The flexible member 185 may comprise a radially outer surface 186 and a radially inner surface 187. The radially outer surface 186 may contact or frictionally engage a portion of the radially inner surface 125 of the runner 112. The forward member 183 may comprise metal such as, for example, steel or titanium.

The middle member 176 may comprise a base 177 and a flexible member 178 extending axially and radially away from the base 177. The base 177 may extend axially along the shaft 106 and may be affixed to the shaft 106. The base 177 may abut the base 172 of the retaining member 171 and may abut the base 184 of forward member 183. The flexible member 178 may extend away from the base 177 and toward the runner 112. The flexible member 178 may terminate in a foot portion 179 having an axially rearward facing surface 180. The axially rearward facing surface 180 of the foot portion 179 may contact or frictionally engage an axially forward facing surface 181 of the step portion 189. The flexible member 178 may define a radially outer surface 182 that may contact the radially inner surface 187 of the flexible member 185 of the forward member 183. The flexible member 178 may have the same or similar surface angle at the contact point as flexible member 185. The middle member 176 may comprise metal such as, for example, steel or titanium.

To prevent galling, the middle member 176 may comprise a different metal than the retaining member 171 and forward member 183. For example, in some embodiments the retaining member 171 and forward member 183 comprise steel, while the middle member 176 comprises titanium. In other embodiments the retaining member 171 and forward member 183 comprise titanium, while the middle member 176 comprises steel.

The retaining member 171, middle member 176, and forward member 183 may cooperate to retain the runner 112. The runner 112 may be radially retained between the seal ring 110 and the forward member 183. The runner 112 may be axially retained between the retaining member 171 and the middle member 176.

The forward member 183 and middle member 176 may cooperate to radially support the runner 112, and may deflect to maintain the runner 112 sealingly engaged with the seal ring 110 as the rotating machine operates. In a cold or shutdown state the runner 112 is axially retained by contact of the step portion 189 with each of the foot 179 and the wall 173. During operation, heating of the seal assembly 100 causes radial thermal growth of the middle member 176 that is translated to an axially compressive force applied to the step portion 189 of the runner 112 as a result of the interaction of the middle member 176 with the forward member 183. More specifically, the radially expanding middle member 176 contacts the radially inner surface 187 of the forward member 183 and is deflected toward the step portion 189. The foot 179 applies an axial force to the step portion 189.

The magnitude and rate of stress on the runner 112 during period of thermal expansion are greatly reduced as compared to existing clip-type runner mounts. Even at the high operating temperatures experienced by certain seal assemblies during engine operation, the disclosed mounting assembly 170 supports the runner 112 while sufficiently compliant as to not cause excessive stresses on the runner 112. The runner mount assembly 160 is effective to dissipate stress and/or energy through deflection of the middle member 176.

A tie nut 190 may be threadably coupled to the shaft 106 and may apply a clamping load to one or more of the forward member 183, middle member 176, and retaining member 171. In some embodiments the tie nut 190 abuts the retaining member 171 as shown in FIG. 1. In other embodiments there may be intervening structures between the tie nut 190 and retaining member 171. The mount assembly 170 may be assembled by sliding the forward member 183, middle member 176, runner 112, and retaining member 171 over the shaft 106 in that order and then applying a clamping force via the tie nut 190. The clamping force imparted by the tie nut 190 may be transferred through the retaining member 171 and serve as the axial compression force holding the step portion 189 between the retaining member 171 and the middle member 176.

The mounting assembly 170, largely through the deflection of the forward member 183 and/or middle member 176, prevents excessive tensile stress in the runner 112.

The seal assembly 100 may further comprise an annular seal member 111. The annular seal member 111 is axially displaced from the seal ring 110 and may comprise a flexible and/or semi-rigid material. The annular seal member 111 may be referred to as a lip seal or a lip seal member. The annular seal member 111 may comprise Teflon or a Teflon derivative material. The annular seal member 111 may be an annular flexible ring that is flexed when positioned relative to the runner 112 (i.e. the annular seal member 111 may be flexed by contact with the runner 112). In some embodiments the annular seal member 111 may be formed as a curved member having a J-shaped cross section. The annular seal member 111 may have a curvilinear face surface 131 that engages the radially outward facing seal surface 120 of the runner 112. The curvilinear face surface 131 may extend from an axially-facing surface to a radially-facing surface, and the radially-facing surface engages the radially outward facing seal surface 120 of the runner 112.

The seal ring 110 may define a plurality of apertures 117 that extend axially through the seal ring 110. During operation, with a higher fluid pressure in the higher pressure fluid cavity 104 as compared to the lower pressure fluid cavity 102, the apertures 117 direct a flow of buffer air from the higher pressure fluid cavity 104 toward the annular seal member 111. The plurality of apertures 117 may be dimensioned and/or spaced about the circumference of the seal ring 110 to achieve a desired flow rate of buffer air.

The flow of buffer air flows through the plurality of apertures 117 and contacts the curvilinear face surface 131 of the annular seal member 111. The flow of buffer air buffers the annular seal member 111. The flow of buffer air additionally reduces leakage from the lower pressure fluid cavity 102 toward the higher pressure fluid cavity 104 past the annular seal member 111 and/or the seal ring 110, by blowing back any oil into the lower pressure fluid cavity 102 if a leakage path develops in the seal ring 110 and/or annular seal member 111.

In some embodiments, the seal assembly 100 further comprises a seal housing 122. The seal housing 122 may be disposed between the runner 112 and the housing 108, and/or between the seal ring 110 and the housing 108, and/or between the annular seal member 111 and the housing 108. The seal housing 122 may comprise a forward seal housing 124 and an aft seal housing 126.

The forward seal housing 124 may define a recess 128 or may cooperate with the aft seal housing 126 to define a recess 128. The recess 128 may be an annular groove. At least a portion of the annular seal member 111 may be disposed in or held in axial position by the recess 128. The forward seal housing 124 may be prevented from axially forward movement relative to the housing 108 by a housing stop 134.

The aft seal housing 126 may comprise an axially-extending portion 121 and a radially-extending portion 123. The axially extending portion 121 may be engaged with or in contact with the housing 108. The radially extending portion 123 may comprise an axially facing surface 132 and may be engaged with or in contact with the seal ring 110. The seal ring 110 may sealingly engage the axially facing surface 132 of the radially extending portion 123 of the seal housing 122. The seal ring 110 may be aided in sealingly engaging the axially facing surface 132 by the axial load on the seal ring 110 caused by the pressure difference between the higher pressure cavity 104 and lower pressure cavity 102.

The forward seal housing 124 and aft seal housing 126 may be integrally formed as a single seal housing 122.

In some embodiments, the seal assembly 100 further comprises a garter spring 129. The garter spring 129 may be disposed radially outward of and engaged with a radially outer surface of the seal ring 110. The garter spring 129 may aide with maintaining engagement of the seal ring 110 to the runner 112 across a predetermined range of rotational speeds.

In some embodiments, the seal assembly 100 further comprises one or more of a snap ring 133 and back plate 135. The snap ring 133 may extend between the seal housing 122 and the runner 112, and may be positioned axially aft of the seal ring 110. The back plate 135 may be positioned axially aft of the seal ring 110 and adjacent and/or abutting the snap ring 133.

In a non-operating condition, the shaft 106 is not rotating and the garter spring 129 imparts a radially inward force on the seal ring 110 to maintain the seal ring 110 sealingly engaged against the runner 112. The seal ring 110 sealingly engaged with the runner 112 and seal housing 122 creates a seal between the higher pressure fluid cavity 104 and the lower pressure fluid cavity 102. The seal ring 110 forms a boundary between the higher pressure fluid cavity 104 and the lower pressure fluid cavity 102.

When the rotating machine begins to operate, heat generated by the rotating machine will cause temperatures of all components to rise, including heat generated by friction between the seal ring 110 and runner 112. The metal shaft 106 and mount assembly 170 will thermally expand more and at a faster rate than the ceramic runner 112. As a result, the radial distance between the shaft 106 and runner 112 will decrease. The components of the mount assembly 170 will accommodate this thermal expansion of the shaft 106 and mount assembly 170. Specifically, radial thermal growth is translated by the middle member 176 into an axially compressive force applied to the step portion 189. The deflection of middle member 176 dissipates energy while maintaining proper engagement between the runner 112 and seal ring 110. Further, the forward member 183 may also deflect in a manner that the forward member 183 serves as a wedge between the runner 112 and middle member 176. The angled contact between the forward member 183 and middle member 176 may convert radial thermal growth to axial compressive force. At maximum operating conditions, the runner 112 is driven by both the forward member 183 (i.e. by contact between flexible member 186 and radially inner surface 125) and the middle member 176 (i.e. by contact between axially rearward facing surface 180 and axially forward facing surface 181).

During operation, in embodiments having a seal ring 110 and runner 112 with matched coefficients of thermal expansion, the seal ring 110 and runner 112 will thermally expand at the same or similar rates, assisting in the maintenance of engagement between the seal ring 110 and runner 112 throughout the full range of thermal transients caused by startup and operation of the rotating machine. For embodiments having an annular seal member 111, a differential pressure between the fluid pressures of the higher pressure fluid cavity 104 and the lower pressure fluid cavity 102 may create a flow of buffer air. The flow of buffer air flows through the plurality of apertures 117 of the seal ring 110 and contacts the curvilinear face surface 131 of the annular seal member 111. The flow of buffer air buffers the annular seal member 111. The flow of buffer air additionally reduces leakage from the lower pressure fluid cavity 102 toward the higher pressure fluid cavity 104 past the annular seal member 111 and/or the seal ring 110.

Figure 3:
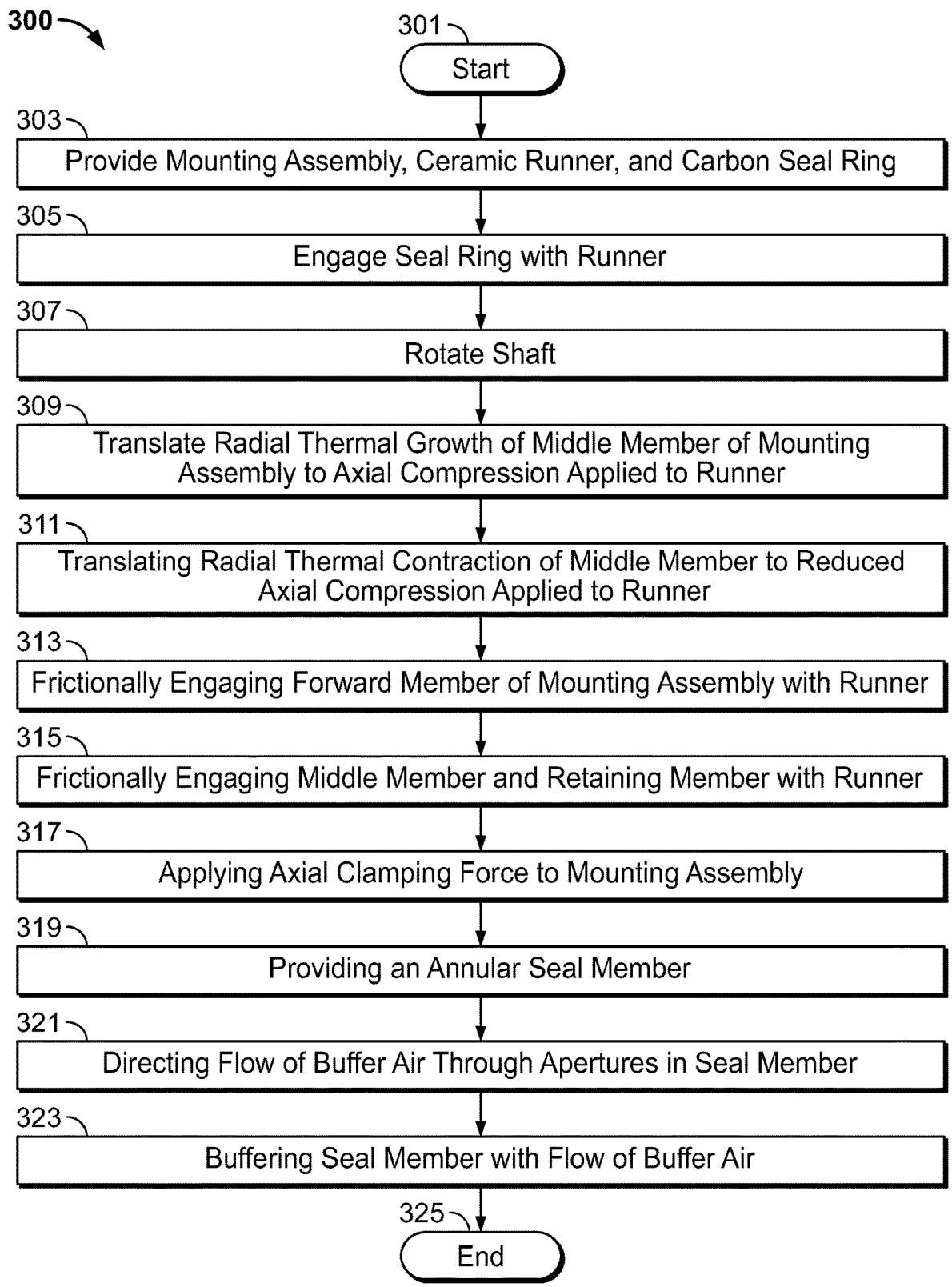
FIG. 3 is a flow diagram of a method in accordance with some embodiments of the present disclosure.

The present disclosure additionally provides methods of sealing a higher pressure fluid cavity 104 from a lower pressure fluid cavity 102. FIG. 3 presents a flow chart of one such method 300. The higher pressure fluid cavity 104 and lower pressure fluid cavity 102 are at least partly disposed between a rotatable shaft 106 and a housing 108 radially displaced from the rotatable shaft 106.

Method 300 starts at Block 301. The steps of method 300, presented at Blocks 301 through 325, may be performed in the order presented in FIG. 3 or in another order. One or more steps of the method 300 may not be performed.

At Block 303, a mount assembly 170, runner 112, and seal ring 110 may be provided. The runner 112 may comprise an axially-extending sealing portion 188 and a radially-inward-extending step portion 189. The mount assembly 170 may comprise a retaining member 171, a forward member 183, and a middle member 176 intermediate the retaining member 171 and forward member 183. The mount assembly 170 may be carried by the shaft 106 and may carry the runner 112. The step portion 189 of the runner 112 may be axially constrained between the retaining member 171 and the middle member 176.

The runner 112 and seal ring 110 may be sealingly engaged at Block 305. At Block 307, the shaft 106 may be rotated. Rotation of the shaft 106 may generate heat in the rotating machine, either through operation of the machine and/or friction between rotating and non-rotating components. This heat generation will cause the shaft 106 and/or mounting assembly 170 to thermally expand.

At Block 309 the radial thermal growth of the shaft 106 and/or mounting assembly 170 is translated by the middle member 176 to an axial compression force applied to the step portion 189 of the runner 112. Radially outward movement of the middle member 176 caused by radial thermal growth results in deflection of the middle member 176 as it contacts the forward member 183. This deflection results in an axial compression force applied to the step portion 189.

At Block 311 the radial thermal contraction of the shaft 106 and/or mounting assembly 170 is translated by the middle member 176 to a reduced axial compression force applied to the step portion 189 of runner 112.

At Block 313 a portion of the forward member 183 may be frictionally engaged with a portion of the sealing portion 188 of the runner 112. At Block 315 a portion of the middle member 176 may be frictionally engaged with a portion of the step portion 189 of the runner 112.

An axial clamping force may be applied to the mount assembly 170 at Block 317. The axial clamping force may be applied via a tie nut 190.

At Block 319 an annular seal member 111 may be provided. A flow of buffer air may be directed through one or more apertures 117 in the seal ring 110 at Block 321. The buffer air flow is directed toward the annular seal member 111. At Block 323, the buffer air flow buffers the annular seal member 111.

Method 300 ends at Block 325.

Figure 4:
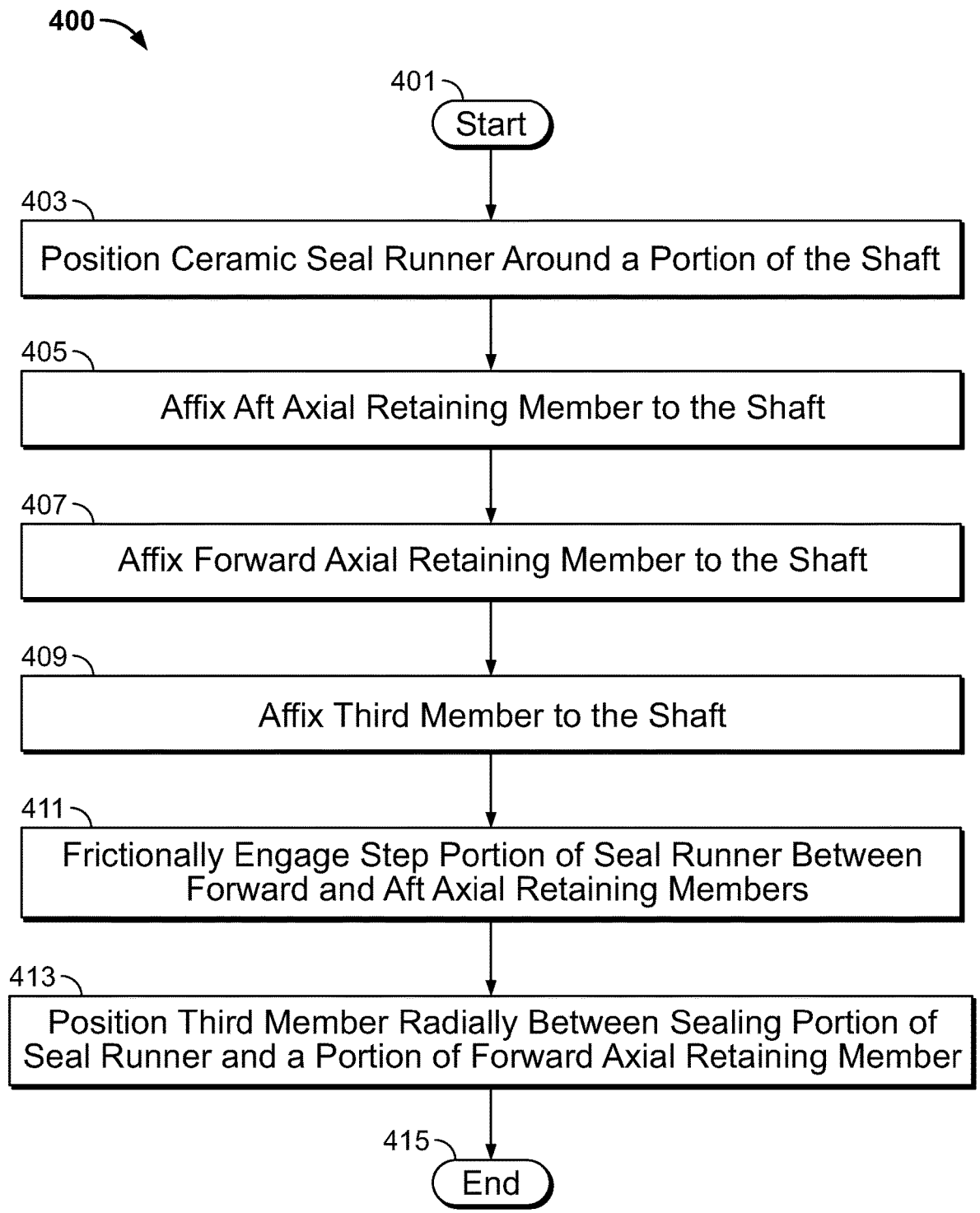
FIG. 4 is a flow diagram of a method in accordance with some embodiments of the present disclosure.
Figure 5:
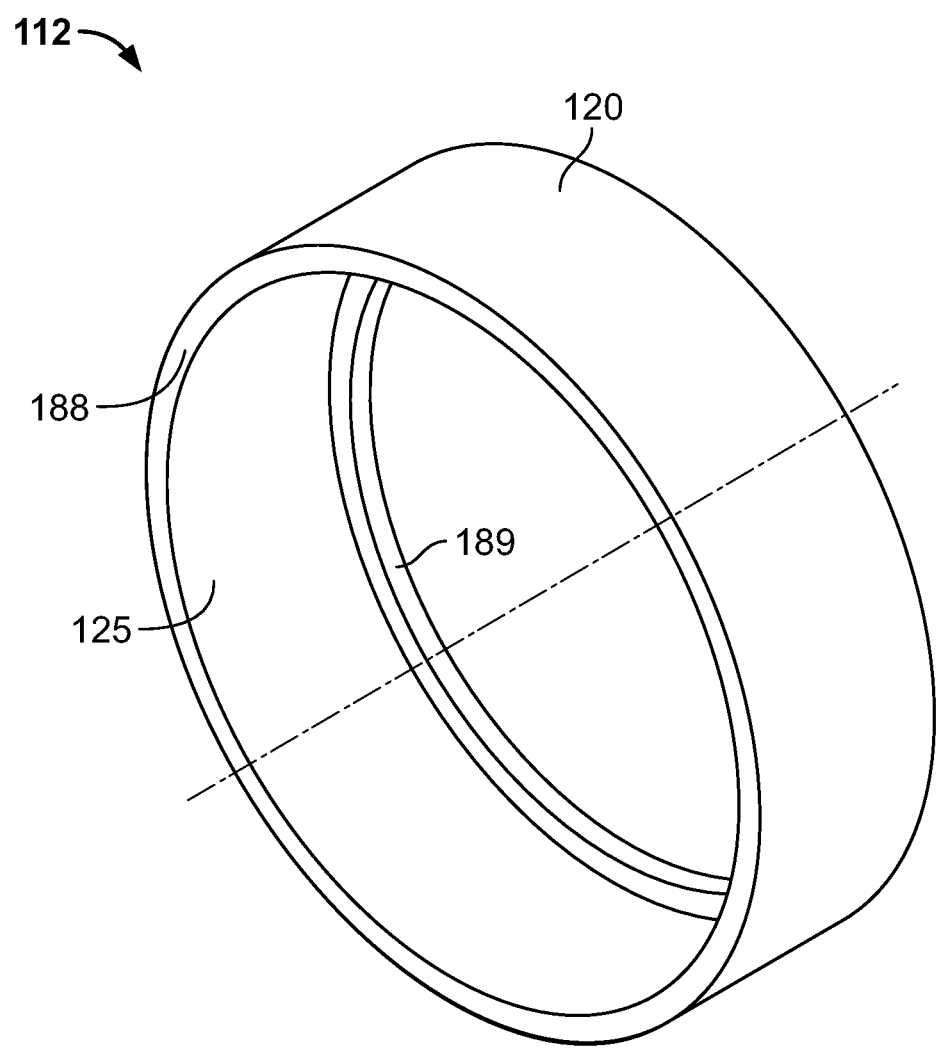
FIG. 5 is an isometric view of a ceramic runner in accordance with some embodiments of the present disclosure.
Figure 6:
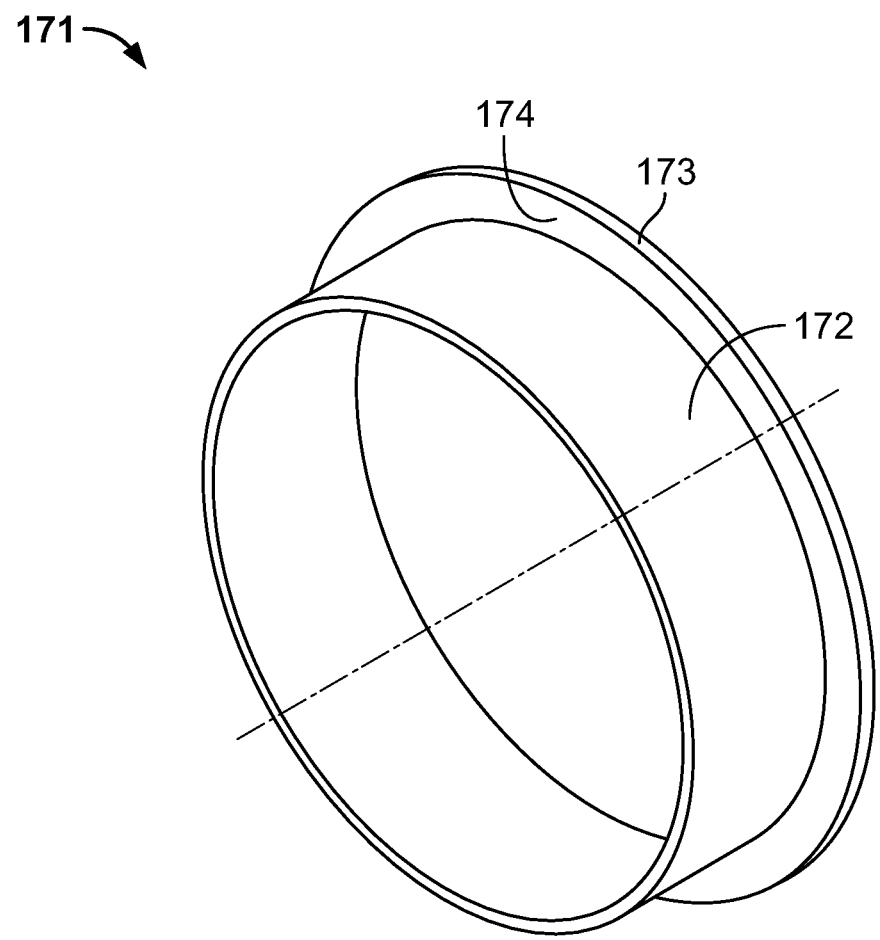
FIG. 6 is an isometric view of a retaining member in accordance with some embodiments of the present disclosure.
Figure 7:
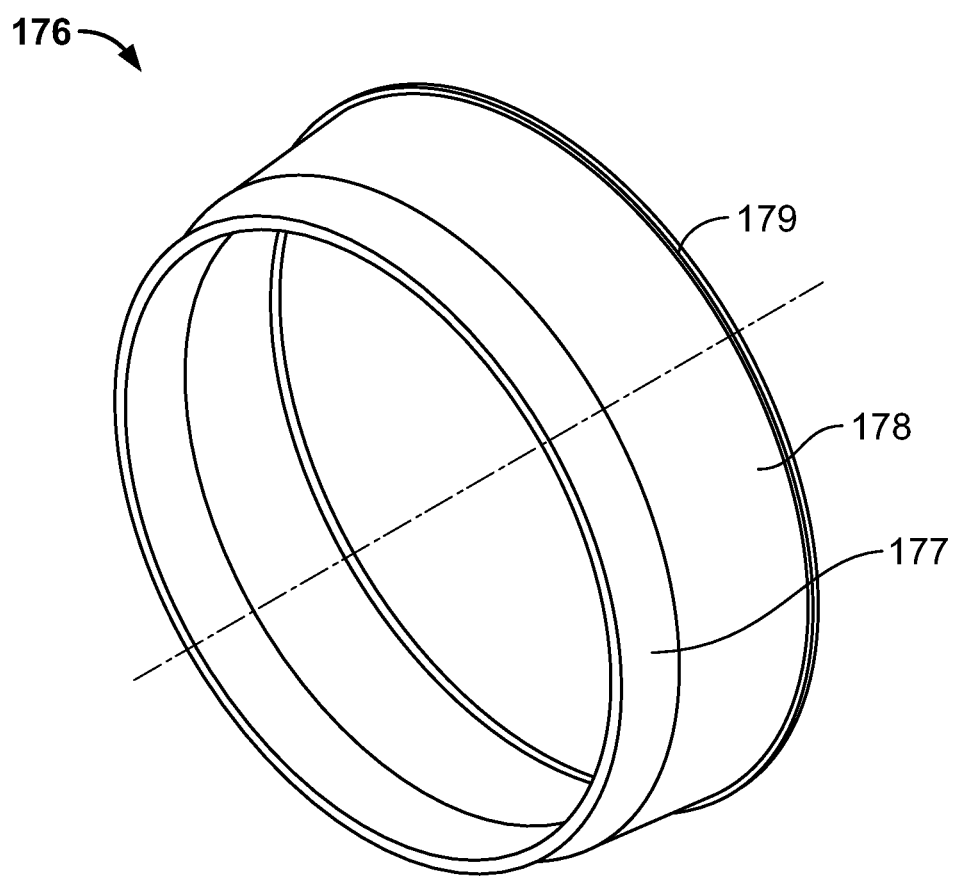
FIG. 7 is an isometric view of a middle member in accordance with some embodiments of the present disclosure.
Figure 8:
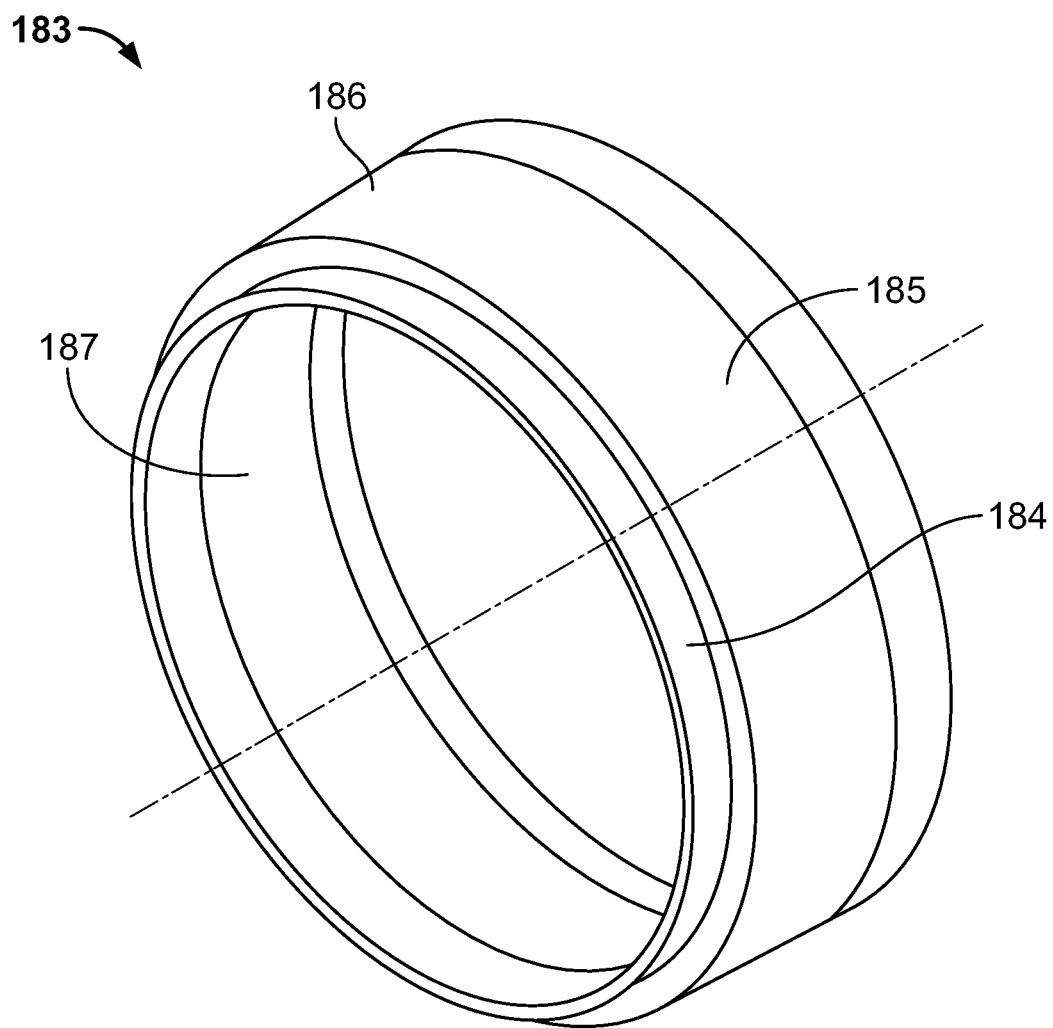
FIG. 8 is an isometric view of a forward member in accordance with some embodiments of the present disclosure.
Figure 9:
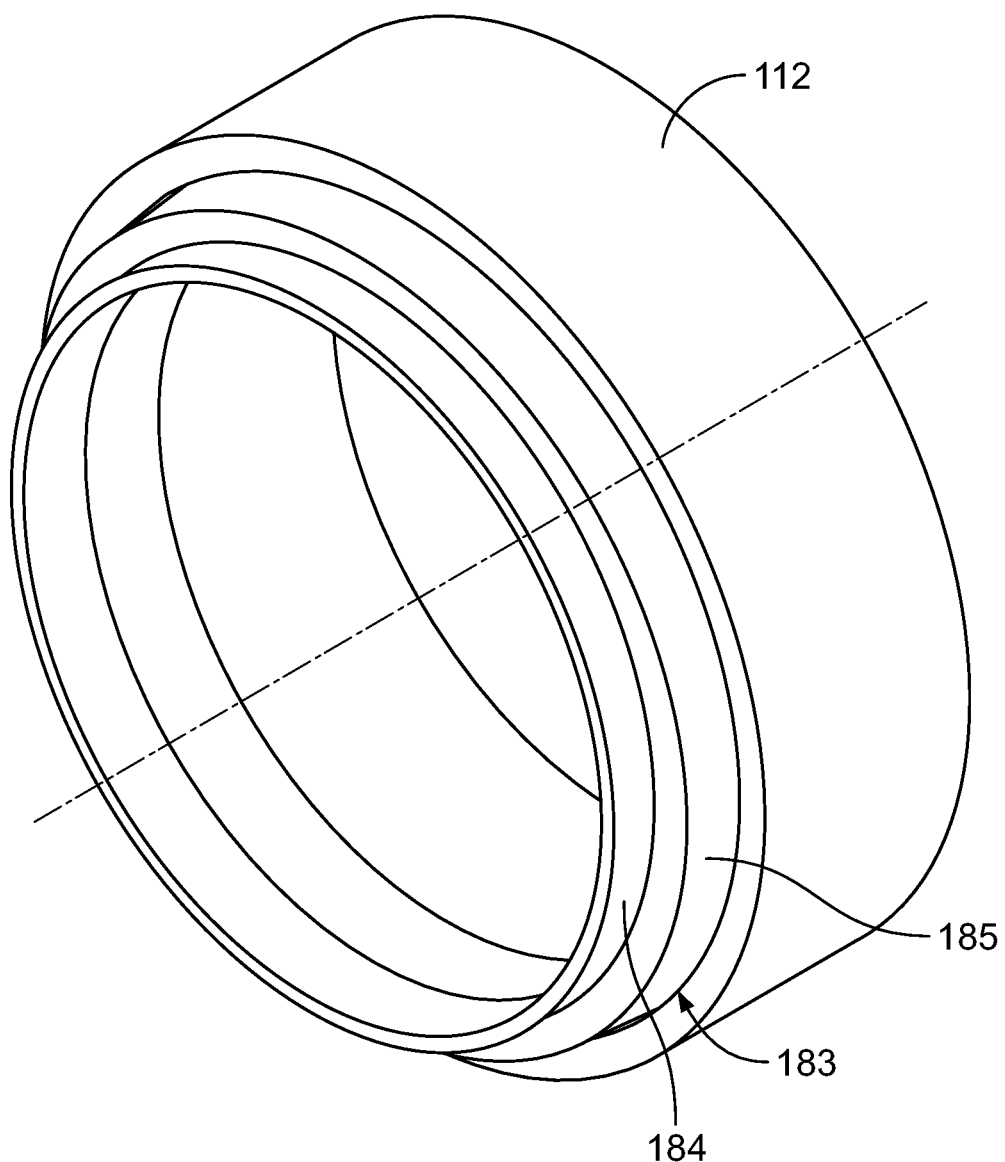
FIG. 9 is an isometric view of a mounting assembly and ceramic runner in accordance with some embodiments of the present disclosure.

FIG. 4 presents a flow chart of another method 400 of the present disclosure. Method 400 starts at Block 401. The steps of method 400, presented at Blocks 401 through 415, may be performed in the order presented in FIG. 4 or in another order. One or more steps of the method 400 may not be performed.

At Block 403 an annular ceramic seal runner 112 may be positioned around a portion of the shaft 106. The runner 112 may comprise a sealing portion 188 and a step portion 189. The sealing portion 188 may extend axially along the shaft 106 and the step portion 189 may extend radially inward from the sealing portion 188.

At Block 405 an aft axial retaining member may be affixed to the shaft 106. The aft axial retaining member may be retaining member 171. The aft axial retaining member may engage the step portion 189 of the runner 112 to inhibit movement of the runner 112 in a first axial direction. The first axial direction may be the axially aft direction.

At Block 407 a forward axial retaining member may be affixed to the shaft 106. The forward axial retaining member may be the middle member 176. The forward axial retaining member may comprise a base portion 177 and a flexible member 178. The base portion 177 may be adjacent to the aft axial retaining member in a second axial direction. The flexible member 178 may extend radially outward from the base portion 177 and axially in the first direction. The flexible member 178 may terminate in a foot portion 179 that engages the step portion 189 of the runner 112 to inhibit movement of the seal runner in the second axial direction. The second axial direction may be the axially forward direction.

At Block 409 a third member may be affixed to the shaft 106. The third member may be forward member 183. The third member may comprise a base portion 184 and a flexible member 185. The base portion 184 may be positioned adjacent to the base portion 177 of the forward axial retaining member in the second axial direction. The flexible member 185 may be positioned radially outward from the base portion 184 and axially in the first axial direction to engage the sealing portion 188 of the runner 112 on one side and the flexible arm 178 of the forward axial retaining member on an opposite side. The flexible member 185 may engage the sealing portion 188 with a radially outer surface 186. The flexible member 185 may engage the forward axial retaining member with a radially inner surface 187.

At Block 411 the step portion 189 of the runner 112 may be frictionally engaged between the forward axial retaining member and the aft axial retaining member. At Block 413 the third member may be positioned radially between the sealing portion 188 of the runner 112 and a portion of the forward axial retaining member to effect axial translation of the forward axial retaining member during thermal expansion of the members.

In some embodiments, method 400 may further comprise selecting materials for the forward axial retaining member and the third member having relative indices of thermal expansion to effect translation of thermal growth of the members to axial extension of the forward axial retaining member in the first axial direction.

Method 400 ends at Block 415.

The present disclosure provides numerous advantages over existing seal assemblies. For example, the presently disclosed seal assembly 100 and methods 300, 400 of forming a seal reduce edge loading and overall stresses experienced in clip-style runner mounts. By mounting the runner from the inner diameter of the runner alone, as opposed to mounting from the inner and outer diameters, the runner/runner mount interface along the outer diameter is eliminated and therefore the edge loading at that interface is also eliminated. The disclosed seal assembly provides improved load distribution and minimized tensile stresses in the runner.

By mounting the runner from the inner diameter alone, the presently disclosed seal assembly also frees space along the outer diameter to have a larger sealing surface. This may enable the inclusion of a lip seal along the sealing surface, owing to the greater size of the sealing surface.

The disclosed seal assembly may be advantageously used in applications where a seal assembly is required in an extremely tight space. For example, the seal assembly may be positioned in applications where the radial gap between the shaft and ceramic runner is less than 0.5 inches. The seal assembly was designed for small space applications while maintaining adequate runner support and manufacturability.

The presently-disclosed seal assembly also includes an advantageous fail-safe. In the event of a failure of the forward member 183, particularly a fracture or partial fracture in the transition between the base 184 and flexible member 185, the runner 112 is still retained by the middle member 176 and retaining member 171. Although the runner 112 may lose some radial support as a result of this failure, the runner 112 would remain largely sealingly engaged with the seal member 110 and only minor leakage would be expected.

Similarly, in the event of a failure of the middle member 176, such as a fracture of the flexible member 178, the runner 112 would likely experience a shift in axial position but would remain retained between the forward member 183 and retaining member 171. Despite the shift in axial position of the runner 112, the runner 112 would remain largely sealingly engaged with the seal member 110 and only minor leakage would be expected. In this scenario, any loose material created by a failure of the middle member 176 (i.e. pieces of the failed member) are likely to be contained in the space bounded by the shaft, runner, retaining member, and forward member.

The fail-safes associated with the disclosed seal assembly ensure no or minimal leakage past the seal during a member failure, thus reducing the likelihood of oil coking, fires, or similar hazards created by seal leakage.

The presently-disclosed seal assembly may also be manufactured less expensively than existing seal assemblies. All components of the mount assembly 170 were designed to ensure traditional machining methods could be utilized to manufacture the components. Thus in some embodiments all components of the mount assembly 170 have a minimum thickness of 50 thousandths of an inch. The components may also be manufactured via 3D printing.

Although examples are illustrated and described herein, embodiments are nevertheless not limited to the details shown, since various modifications and structural changes may be made therein by those of ordinary skill within the scope and range of equivalents of the claims.

What is claimed is:

1. An assembly comprising:
   a rotatable shaft;
   an annular ceramic seal runner comprising a sealing portion extending around an axial portion of said shaft and a step portion extending radially inward from said sealing portion; and
   a mounting assembly affixed to said shaft and carrying said seal runner in axial and radial alignment with said shaft, said mounting assembly comprising:
   a retaining member comprising a base affixed to said shaft and a wall extending radially outward from said base, said wall having an axially forward facing surface in contact with an axially rearward facing surface of the step portion of said seal runner;

a middle member comprising a base affixed to said shaft axially forward of the base of said retaining member and a flexible member extending axially rearward and radially outward from said base, said flexible member terminating in a foot portion having a surface in contact with an axially forward facing surface of the step portion of said seal runner; and a forward member comprising a base affixed to said shaft axially forward of the base of said middle member and a flexible member extending axially rearward and radially outward from said base, said flexible member having a radially outer surface in contact with a portion of a radially inner surface of the sealing portion of said seal runner and a radially inner surface in contact with a radially outer surface of the flexible member of said middle member.

2. The assembly of claim 1 wherein said mounting assembly converts radial thermal expansion to axial compression applied to said step portion of said ceramic runner.

3. The assembly of claim 2 wherein a radially outward facing seal surface of said runner is free of loading from the mounting assembly.

4. The assembly of claim 1 wherein said ceramic runner is axially retained by frictional engagement of said step portion with each of said foot portion of said middle member and said wall of said retaining member.

5. The assembly of claim 1 wherein the base of said middle member abuts the base of said forward member and the base of said retaining member.

6. The assembly of claim 5 further comprising a tie nut providing an axial clamping load to said retaining member, said middle member, and said forward member.

7. The assembly of claim 1 wherein said retaining member and said forward member comprise steel, and wherein said middle member comprises titanium.

8. A seal assembly for sealing a higher pressure fluid cavity from a lower pressure fluid cavity, said cavities at least partially disposed between a rotatable shaft and a housing radially displaced from said rotatable shaft, the seal assembly comprising:

an annular ceramic seal runner comprising a sealing portion extending around an axial portion of said shaft and a step portion extending radially inward from said sealing portion, said sealing portion having a radially outward facing seal surface; and a mounting assembly affixed to said shaft and carrying said seal runner, said mounting assembly comprising:

a retaining member comprising a base affixed to said shaft and a wall extending radially outward from said base, said wall having an axially forward facing surface in contact with an axially rearward facing surface of the step portion of said seal runner;

a middle member comprising a base affixed to said shaft axially forward of the base of said retaining member and a flexible member extending axially rearward and radially outward from said base, said flexible member terminating in a foot portion having a surface in contact with an axially forward facing surface of the step portion of said seal runner; and a forward member comprising a base affixed to said shaft axially forward of the base of said middle member and a flexible member extending axially rearward and radially outward from said base, said flexible member having a radially outer surface in contact with a portion of a radially inner surface of the sealing portion of said seal runner and a radially inner surface in contact with a radially outer surface of the flexible member of said middle member; and a carbon seal ring sealingly engaged with the housing and having a radially inward facing seal surface engaged with the radially outward facing seal surface of the seal runner to thereby form a boundary between the higher pressure fluid cavity and the lower pressure fluid cavity.

9. The seal assembly of claim 8 wherein the seal runner is axially retained between said foot of said middle member and said wall of said retaining member.

10. The seal assembly of claim 9 wherein the seal runner is radially retained between said radially outer surface of said retaining member and said seal ring.

11. The seal assembly of claim 8 further comprising an annular seal member coupled to the housing axially displaced from said seal ring in the lower pressure fluid cavity, the seal member having a curvilinear face surface that engages said radially outward facing seal surface of said seal runner.

12. The seal assembly of claim 11 wherein said higher pressure fluid cavity comprises at least in part a buffer air chamber, and wherein a plurality of apertures extending axially through the seal ring direct a flow of buffer air from the buffer air chamber toward the annular seal member.

13. The seal assembly of claim 12 wherein said curvilinear face surface bends from an axially-facing surface to a radially-facing surface, and wherein said radially-facing surface engages said radially outward facing seal surface of said seal runner.

14. The seal assembly of claim 8 wherein said runner and said seal ring are formed from materials having coefficients of thermal expansion that are matched to effect sealing engagement between said runner and said seal ring over a predetermined range of operating temperatures.

15. The seal assembly of claim 8 wherein said radially outward facing seal surface of said runner is free of loading from the mounting assembly.

16. A method of mounting a ceramic seal runner to a rotatable shaft, said method comprising:

positioning an annular ceramic seal runner around a selected portion of the shaft, the seal runner comprising a sealing portion extending axially along the shaft and a step portion extending radially inward toward the shaft;

frictionally engaging the step portion between a forward axial retaining member and an aft axial retaining member;

positioning a third member radially between the sealing portion of the seal runner and a portion of the forward axial retaining member to effect axial translation of the forward axial retaining member during thermal expansion of the members.

17. The method of claim 16 further comprising:

affixing the aft axial retaining member to the shaft, the aft axial retaining member engaging the step portion of the seal runner to inhibit movement of the seal runner in a first axial direction.

18. The method of claim 17 further comprising:

affixing the forward axial retaining member to the shaft, the forward axial retaining member comprising a base portion adjacent to the aft axial retaining member in a second axial direction and a flexible member extending radially outward from the base and axially in the first direction, the flexible member terminating in a foot portion engaging the step portion of the seal runner to inhibit movement of the seal runner in the second axial direction.

19. The method of claim 18 further comprising:
affixing the third member to the shaft, the third member comprising a base portion adjacent to the base of the forward axial retaining member in the second direction and a flexible member radially outward from said base and axially in the first direction to engage the sealing portion of the seal runner on one side and the flexible arm of the forward axial retaining member on an opposite side.

20. The method of claim 19 further comprising:
selecting materials for the forward axial retaining member and the third member having relative indices of thermal expansion to effect translation of thermal growth of the members to axial extension of the forward axial retaining member in the first direction.

* * * * *